US011989431B2

(12) United States Patent
Moshe et al.

(10) Patent No.: US 11,989,431 B2
(45) Date of Patent: May 21, 2024

(54) WRITE UPDATES SORTING DURING BKOPS IDLE

(71) Applicant: Western Digital Technologies, Inc., San Jose, CA (US)

(72) Inventors: Eran Moshe, Kfar Saba, IL (US); Nava Eisenstein, Petach tikwa (IL); Tomer Baron, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 116 days.

(21) Appl. No.: 17/688,384

(22) Filed: Mar. 7, 2022

(65) Prior Publication Data

US 2023/0280919 A1    Sep. 7, 2023

(51) Int. Cl.
*G06F 3/06* (2006.01)

(52) U.S. Cl.
CPC .......... *G06F 3/0635* (2013.01); *G06F 3/0604* (2013.01); *G06F 3/0679* (2013.01)

(58) Field of Classification Search
CPC ..... G06F 3/0635; G06F 3/0679; G06F 3/0604
See application file for complete search history.

(56) References Cited

U.S. PATENT DOCUMENTS

| | | | |
|---|---|---|---|
| 10,359,955 B2 | 7/2019 | Inbar et al. | |
| 10,459,636 B2 | 10/2019 | Frid et al. | |
| 10,732,878 B1* | 8/2020 | Muthiah | G06F 12/0246 |
| 11,003,587 B2 | 5/2021 | Haswell | |
| 2018/0239547 A1* | 8/2018 | Inbar | G06F 12/0246 |
| 2020/0327064 A1* | 10/2020 | Kang | G06F 13/1668 |
| 2021/0048948 A1 | 2/2021 | Frid et al. | |
| 2021/0073141 A1* | 3/2021 | Conklin | G06F 12/0246 |
| 2021/0200447 A1* | 7/2021 | Gupta | G06F 3/0679 |

OTHER PUBLICATIONS

Yinan Li, et al., Tree Indexing on Solid State Drives, 2010, Proceedings of the VLDB Endowment, vol. 3, No. 1-2, Sep. 1, pp. 1195-1206.

Karthik V., et al., Improving Search Performance of B-Tree on Flash Devices, 2018, International Journal of Advances in Electronics and Computer Science, vol. 5, Issue 6, pp. 32-36.

* cited by examiner

*Primary Examiner* — Jane W Benner
(74) *Attorney, Agent, or Firm* — PATTERSON + SHERIDAN, LLP

(57) ABSTRACT

A data storage device includes a memory device and a controller coupled to the memory device. The controller is configured to store data mappings in an uLayer, where the uLayer includes a plurality of mSet updates, and where the uLayer is organized into a sorted section and an unsorted section, sort one or more of the plurality of mSet updates of the uLayer, and provide, to a host device, data stored in the memory device corresponding to a most recent update of a data mapping by ignoring non-recent updates for a read command associated with an mSet group of the sorted section.

10 Claims, 5 Drawing Sheets

WRITE UPDATES SORTING DURING BKOPS IDLE

BACKGROUND OF THE DISCLOSURE

Field of the Disclosure

Embodiments of the present disclosure generally relate to data storage devices, such as solid state drives (SSDs), and, more specifically, improving data storage device performance for random read commands.

Description of the Related Art

Data storage devices store mapping data for data programmed to one or more memory devices of the data storage devices. The mapping data may be stored in logical block address (LBA) to physical block address (PBA) (L2P) tables. A mapping structure of the L2P tables may include an uLayer, where the uLayer includes one or more mSets. Each of the one or more mSets may be a data mapping. The data mappings may include an indication of where data is stored in the memory device or where the more updated data mapping is located.

In one example, the uLayer includes a bit map that indicates which mSets reside in the uLayer. When the relevant mSet is not in the uLayer, the uLayer may not be searched. In another example, a bloom filter may be added per region of the uLayer. The bloom filter is a probabilistic data structure that can answer if a requested entry is not in the searched region. The bloom filter may require storage space and may be intended for random and mixed workloads. However, random access memory (RAM) storage space is limited. Furthermore, using a bloom filter may result in additional or unnecessary searches in the uLayer due to false positive results. In yet another example, updates to the uLayer may be located in a sub-list. However, the sub-list may require additional memory storage space. In the previously listed examples, additional memory storage space and/or time may be required to complete the searching or storing of data mappings in the uLayer, which may increase latency and decrease data storage device performance.

Therefore, there is a need in the art for an improved data mapping storage in an uLayer structure of the data storage device.

SUMMARY OF THE DISCLOSURE

The present disclosure generally relates to data storage devices, such as solid state drives (SSDs), and, more specifically, improving data storage device performance for random read commands. A data storage device includes a memory device and a controller coupled to the memory device. The controller is configured to store data mappings in an uLayer, where the uLayer includes a plurality of mSet updates, and where the uLayer is organized into a sorted section and an unsorted section, sort one or more of the plurality of mSet updates of the uLayer, and provide, to a host device, data stored in the memory device corresponding to a most recent update of a data mapping by ignoring non-recent updates for a read command associated with an mSet group of the sorted section.

In one embodiment, a data storage device includes a memory device and a controller coupled to the memory device. The controller is configured to store data mappings in an uLayer, where the uLayer includes a plurality of mSet updates, and where the uLayer is organized into a sorted section and an unsorted section, sort one or more of the plurality of mSet updates of the uLayer, and provide, to a host device, data stored in the memory device corresponding to a most recent update of a data mapping by ignoring non-recent updates for a read command associated with an mSet group of the sorted section.

In another embodiment, a data storage device includes a memory device and a controller coupled to the memory device. The controller is configured to receive a read command for data stored in the memory device, search an uLayer corresponding to the read command for a data mapping, where the uLayer includes a plurality of mSet updates, and where the uLayer is organized into a sorted section and an unsorted section, and retrieve first data stored in the memory device corresponding to a most recent update of the data mapping corresponding to the read command by ignoring non-recent updates for a read command associated with an mSet group of the sorted section.

In another embodiment, a data storage device includes memory means and a controller coupled to the memory means. The controller is configured to store data mappings in an uLayer, where the uLayer includes a plurality of mSet updates, and where the uLayer is organized into a sorted section and an unsorted section.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improving data storage device performance for random read commands. A data storage device includes a memory device and a controller coupled to the memory device. The controller is configured to store data mappings in an uLayer, where the uLayer includes a plurality of mSet updates, and where the uLayer is organized into a sorted section and an unsorted section, sort one or more of the plurality of mSet updates of the uLayer, and provide, to a host device, data stored in the memory device corresponding to a most recent update of a data mapping by ignoring non-recent updates for a read command associated with an mSet group of the sorted section.

Figure 1:
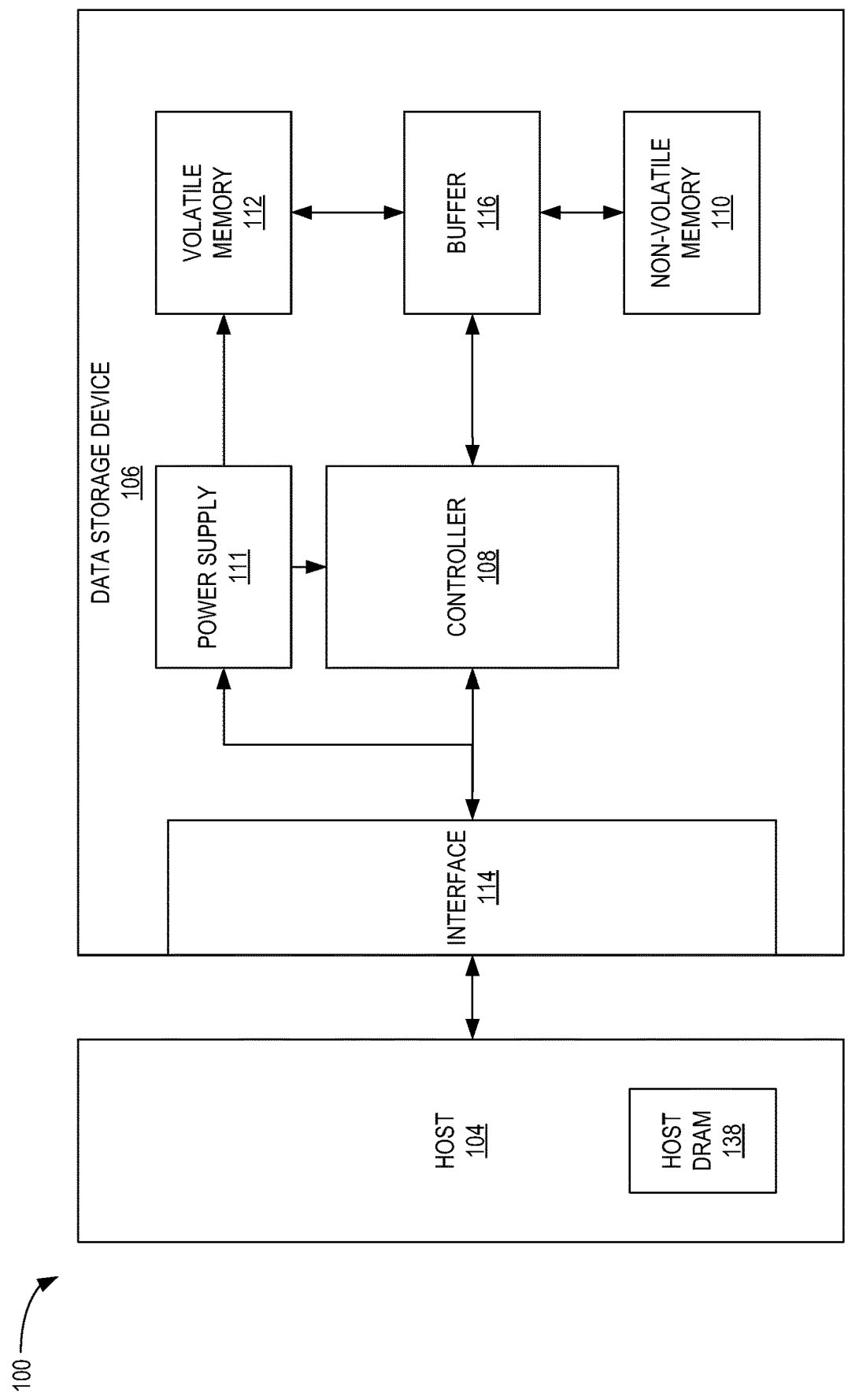
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
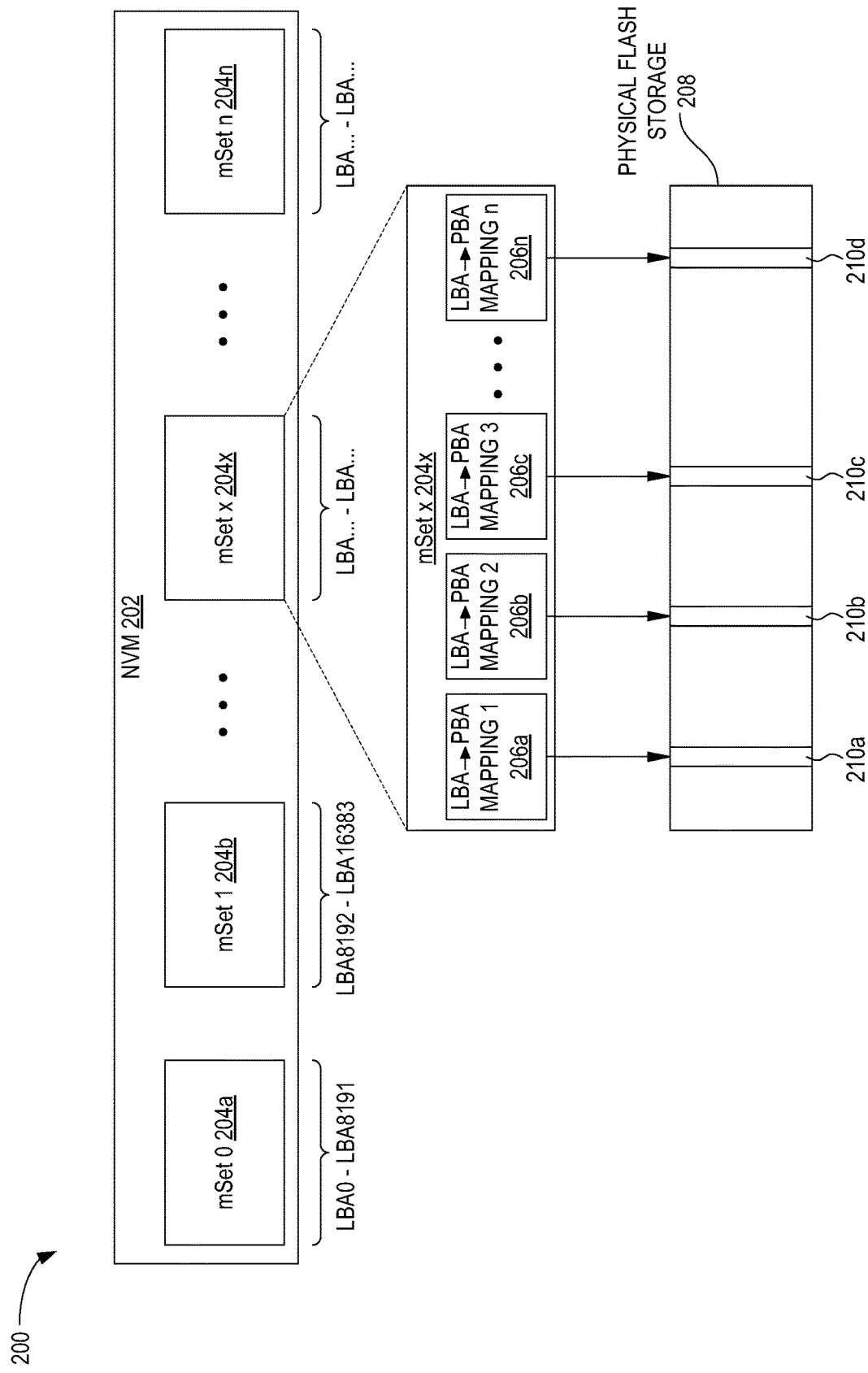
FIG. 2 is an exemplary illustration of a data mapping structure, according to certain embodiments.

FIG. 2 is an exemplary illustration of a data mapping structure 200, according to certain embodiments. The data mapping structure 200 is stored to the NVM 202. In some embodiments, the data mapping structure 200 may be stored, additionally, to volatile memory, such as the volatile memory 112 of FIG. 1. In other embodiments, the data mapping structure 200 may be stored in both NVM 202 and the volatile memory 112. The volatile memory 112 may be used as a cache for the data mapping structure 200, where the NVM 202 is used to store the data mapping structure 200 and protect the data mapping structure 200 against ungraceful shutdown events.

The NVM 202 includes a plurality of mSets 204a-204n. For simplification purposes, the plurality of mSets 204a-204n located in a uLayer may refer to a plurality of mSet updates. The plurality of mSets 204a-204n may be logically arranged into regions of an uLayer. The uLayer is a linked list of data mapping updates. Each mSet exists in a specific uLayer region. For writes commands, the mappings are saved to the uLayer in order of arrival time. Therefore, a complex search for a relevant mapping may be required when the mapping is not directly available in the mSet. When a read command is received, a controller, such as the controller 108 of FIG. 1, may search for the relevant entry in the relevant uLayer or the relevant mSet. In some examples, each uLayer may be associated with a distinct one or more LBA ranges. In some embodiments, the controller 108 may first search the volatile memory 112 for the relevant mapping. If the mapping is not located in the volatile memory 112, then the relevant mSet is loaded from the NVM 202 and merged with a local mapping in the uLayer.

An mSet, such as the first mSet 204a, includes a plurality of logical block address (LBA) to physical block address (PBA) mappings. In some examples, the LBA may be a fixed location LBA (FFLBA) and the PBA may be a jumbo block address (JBA). Each mapping entry of the first mSet 204a may be about 4 KB, where the mSet 204a has a size of 32 MB. Therefore, each mSet may have about 8192 mappings. In other words, each mSet corresponds to a plurality of LBAs. For example, first mSet 204a corresponds to an LBA range of LBA 0 to LBA 8191. Similarly, a second mSet 204b corresponds to an LBA range of LBA 8192 to LBA 16383. The previously listed values are not intended to be limiting, but to provide an example of a possible embodiment. For example, mSet×204x includes a plurality of mappings 206a-206n, where n is a maximum number of mappings per mSet. Each of the plurality of mappings 206a-206n is associated with a flash management unit (FMU) size of about 4 KB of a physical flash storage 208, and each mapping 206a-206n is stored in a respective location 210a-210d of the physical flash storage 208. The physical flash storage 208 may be the physical storage locations of the NVM 202.

Figure 3:
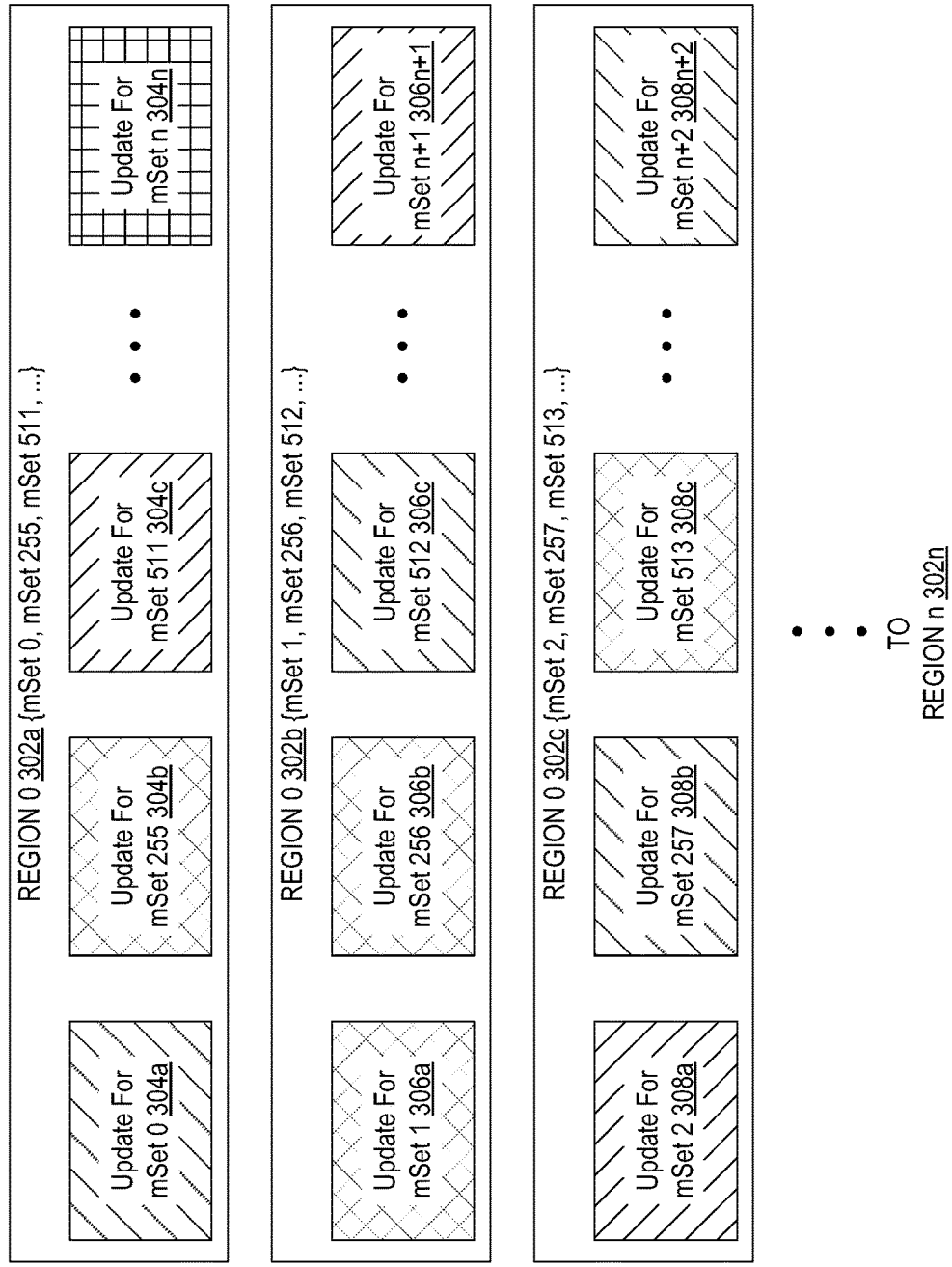
FIG. 3 is an exemplary illustration of an uLayer, according to certain embodiments.

FIG. 3 is an exemplary illustration of an uLayer 300, according to certain embodiments. The uLayer 300 has a plurality of regions 302a-302n. Each of the plurality of regions are associated with one or more mSet groups, such that updates to the one or more mSet groups are stored in the respective region, where updates to a same mSet are stored in the mSet group. Each region includes a plurality of updates 304a-304n, 306a-306n+1, 308a-308n+2 for a respective mSet group of the region. For example, a first region 0 302a has a first update 304a corresponding to mSet group 0, a first update 304b corresponding to mSet group 255, a first update 304c corresponding to mSet group 511, and an n-th update 304n corresponding to mSet group n. Each region may store up to 8192 mSet group updates or mappings.

It is to be understood that the illustrated structure is not intended to be limiting, but to provide an example of a possible embodiment. For example, although uLayer 300 shows that each of the plurality of regions 302a-302n includes a single update for each associated mSet group, there may more than one update for one or more mSet groups in the region. In other words, each region of the plurality of regions 302a-302n may store one or more updates for each mSet group associated with the region. It is to be further understood that because each mSet group is associated with a region of the plurality of regions 302a-302n, there may not be an update for the mSet group stored in the region due to no updates for the mSet group being received.

When the uLayer 300 is not sorted, such that updates for a same mSet group or LBA region are not grouped and sorted by arrival time and/or LBA address, searching for a relevant mapping in the uLayer 300 may take an extended period of time, which may impact overall performance of the data storage device. Each region of the plurality of regions 302a-302n may be sorted separately of each other. Furthermore, each region of the plurality of regions 302a-302n may have different triggers to indicate to the controller 108 to sort the particular region. Thus, each region may be sorted such that mappings for a same LBA region of an mSet group are stored together and sorted chronologically by arrival time.

When the controller 108 executes a random read or write command, the execution latency may be dependent on searching for the relevant mapping entry and/or triggering additional operations to retrieve and merge recent mappings with mappings in the volatile memory 112. However, when the controller 108 executes a sequential read or write command, the mSet may be loaded from the NVM 110 and merged with the uLayer from a previous operation. The merging and searching for the recent mapping associated with the sequential read or write command may require additional time due to the updates not being in order. Thus, the latency of completing the sequential read or write command may be affected.

Figure 4A:
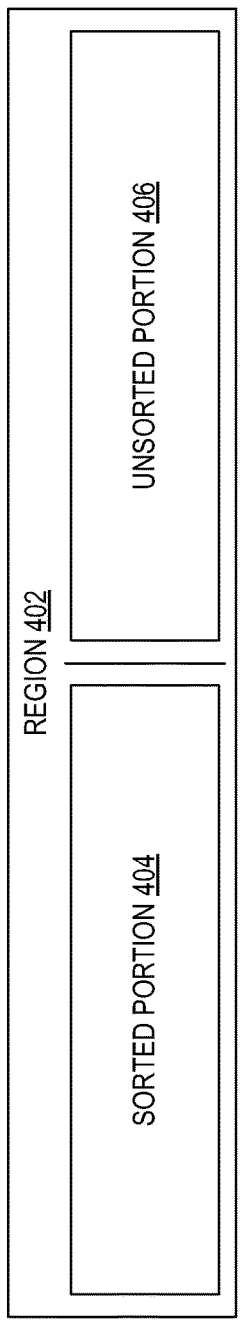
FIGS. 4A-4C are exemplary illustrations of an uLayer region that includes a sorted portion and an unsorted portion, according to certain embodiments.
Figure 4B:
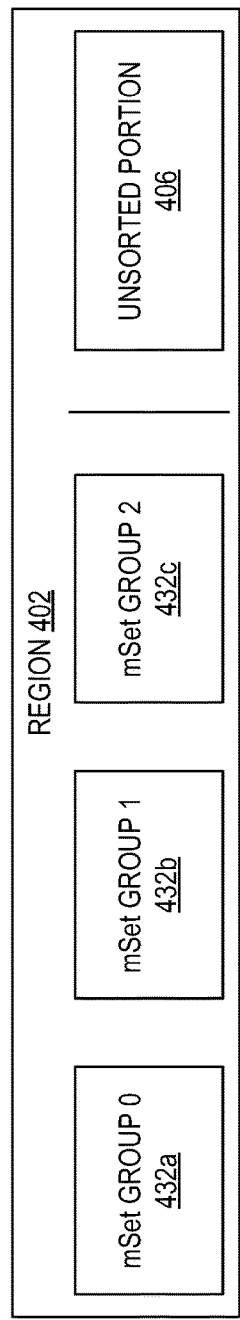
Figure 4C:
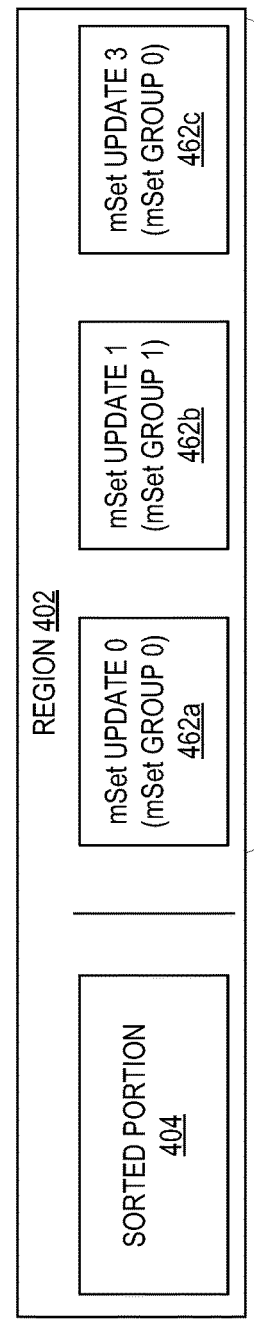

FIGS. 4A-4C are exemplary illustrations of an uLayer region 402, hereinafter region 402 for simplification, that includes a sorted portion 404 and an unsorted portion 406, according to certain embodiments. For simplification purposes, aspects of FIGS. 4A-4C may be described together herein. Furthermore, aspects of the storage system 100 of FIG. 1 and the uLayer 300 of FIG. 3 may be referenced herein for exemplary purposes. Referring to FIGS. 4B and 4C, it is to be understood that the number of mSet groups depicted is not intended to be limiting but to provide an example of a possible embodiment.

Region 402 includes the sorted portion 404 and the unsorted portion 406. Although illustrated as two separate portions of region 402, it is to be understood that the sorted portion and the unsorted portion may be logically coupled and either physically in the same location of a memory device, such as the NVM 110 or the volatile memory 112, storing the uLayer or physically in different locations of a memory device, such as the NVM 110 or the volatile memory 112, storing the uLayer. Furthermore, the controller 108 may utilize a logical indicator to mark a separation or indicate a distinction between the sorted portion 404 and the unsorted portion 406. It is to be understood that an mSet update may be for a same data mapping that has a previous update in the region 402 or for a different data mapping that does not have a previous update in the region 402.

Referring to FIG. 4B, the sorted portion 404 includes mSet group 0 432a, mSet group 1 432b, and mSet group 2 432c. The mSet groups in the sorted portion 404 may be sorted by group number, mSet group size, an age of the mSet group, or any other applicable sorted arrangement. Furthermore, each mSet group of the sorted portion 404 includes one or more mSet updates. The one or more mSet updates are of each mSet group in the sorted portion 404 may be chronologically ordered by arrival time. Therefore, when scanning for a most recent update of a relevant mSet group in the sorted portion, such as mSet group 0 432a, the controller 108 may scan from the last entry to the first entry, where the most recent data mapping update information is located closer to the last entry. In another examples, the controller 108 may scan the sorted portion 404 from first entry to last entry.

Referring to FIG. 4C, the unsorted portion 406 includes an mSet update 0 462a, an mSet update 1 462b, and an mSet update 3 462c. The mSet update 0 462a is an update to a data mapping corresponding to mSet group 0, the mSet update 1 462b is an update to a data mapping corresponding to mSet group 1, and the mSet update 3 462c is an update to a data mapping corresponding to mSet group 3. The mSet updates located in the unsorted portion 406 are stored in chronological order by arrival time. Thus, in the unsorted portion 406, the mSet updates for mSet groups are mixed (e.g., mSet update 0 462a is not adjacent to mSet update 3 462c). Searching the unsorted portion 406 may be time consuming due to the relevant mSet updates not being chronologically sorted.

The controller 108 may sort region 402 as a result of one or more indications. It is to be understood that the indications may be received by the controller 108, such as the host device 104 may send the indication to the controller 108, or the controller 108 may determine that sorting should happen. For example, when the data storage device 106 enters an idle mode or has unused bandwidth, the controller 108 may utilize any available bandwidth to sort the unsorted portion 406 and logically arrange the sorted unsorted portion 406 into the respective mSet groups of the sorted portion 404. For example, mSet update 0 462a and mSet update 3 462c may be logically arranged next to each other, where mSet update 3 462c is arranged after mSet update 0 462a. It is to be understood that sorting may also include copying relevant mSet updates to the respective mSet groups of the sorted portion 404 and erasing the relevant mSet updates from the unsorted portion 406 after the copying is completed.

After sorting the unsorted portion 406, the sorted mSet updates are concatenated into the relevant mSet groups of the sorted portion 404 while maintaining mSet update arrival time chronological order per mSet group. In the previous example, the sorted mSet update 0 462a and the mSet update 3 462c are added to mSet group 0 432a of the sorted portion. In another example, the controller 108 may traverse through the unsorted portion 406 and add the mSet updates of the unsorted portion 406 of the to the relevant mSet groups of the sorted portion 404.

Figure 5:
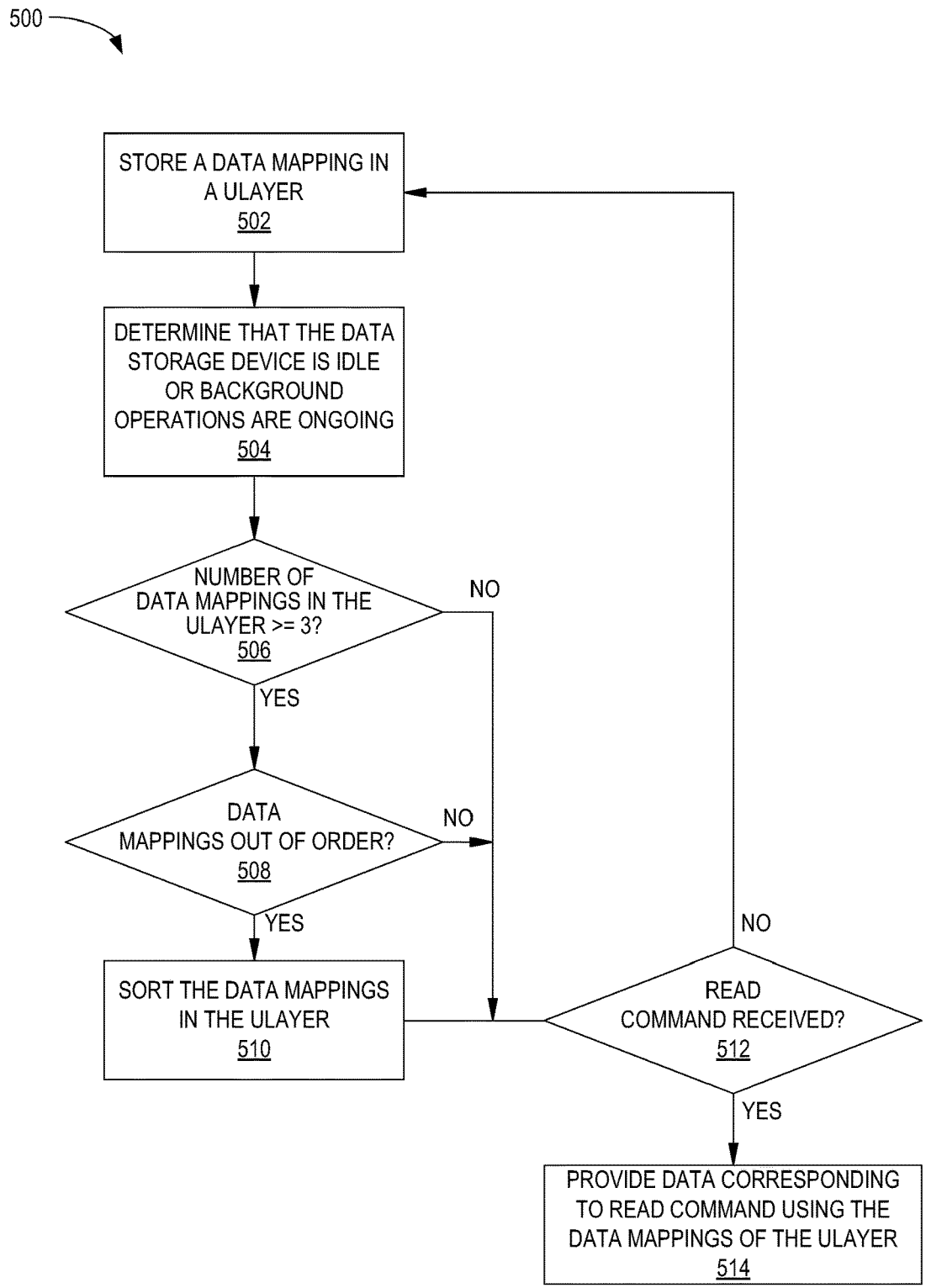
FIG. 5 is a flow diagram illustrating a method of an improved uLayer operation, according to certain embodiments.

FIG. 5 is a flow diagram illustrating a method 500 of an improved uLayer operation, according to certain embodiments. Method 500 may be implemented by a controller, such as the controller 108 of FIG. 1. Furthermore, aspects of the storage system 100 of FIG. 1 may be referenced herein for exemplary purposes. It is to be understood that the terms "data mapping" and "mSet update" may be interchangeably referred to for exemplary purposes.

At block 502, the controller 108 stores a data mapping to an uLayer, such as the uLayer 300 of FIG. 3, where the data mapping is stored in a relevant region, such as region 402 of FIGS. 4A-4C, of the uLayer 300. If region 402 already includes a sorted portion, such as the sorted portion 404, and an unsorted portion, such as the unsorted portion 406, the controller 108 stores the data mapping to the unsorted portion 406 in the next available location. The data mapping may be an mSet update corresponding to new data that either corresponds to old data previously stored (i.e., updated data) or new data that does not correspond to old data previously stored. At block 504, the controller 108 determines that the data storage device 106 is in an idle power state or that background operations are ongoing.

At block 506, the controller 108 determines if the number of data mappings in the uLayer 300 is greater than or equal to 3. It is to be understood that the controller 108 may determine if the number of data mappings in the region 400 is greater than or equal to 3. The previously listed number is not intended to be limiting, but to provide an example of a possible embodiment. Furthermore, the number of data mappings may be for the entire region or for the unsorted portion of the region. If the number of data mappings in the uLayer, or the region, is not greater than or equal to 3 at block 506, then the controller 108 determines if a read command has been received at block 512. However, if the number of data mappings in the uLayer, or the region, is greater than or equal to 3, then, at block 508, the controller 108 determines if there are any data mappings out of order. For example, because data mappings are stored at the time they are received by the controller 108, data mappings may be out of order and not grouped by mSet group and/or chronologically by mSet update.

If the controller 108 determines that the data mappings are not out of order at block 508, then the controller 108 determines if a read command has been received at block 512. However, if the controller 108 determines that the data mappings are out of order at block 508 and the data storage device 106 is still in an idle power state and/or background operations are occurring, then the controller 108 sorts the data mappings in the uLayer or the region at block 510. The sorting may be completed in an inline mode which replaces updates one by one and may not require external memory. Thereafter, the controller 108 determines if a read command has been received at 512.

If the controller 108 determines that a read command has not been received at block 512, then method 500 returns to block 502. However, if the controller 108 determines that a read command has been received at block 512, then the controller 108 provides the data corresponding to the read command using the data mapping or data mappings of the uLayer at 514. For example, the controller 108 may search the sorted portion 404 corresponding to the relevant region of the uLayer corresponding to the read command for a most recent update of the data associated to the read command. The searching may be a binary search, where the controller 108 skips and/or ignores non-relevant updates and/or outdated updates. The controller 108 may add one or more ignored updated data mappings corresponding to a previous version of the data associated with the read command to an outdated list. The outdated list may be referenced for block reuse operations by the controller 108.

In one example, the controller 108 searches the sorted portion 404. In another example, the controller 108 searches the sorted portion 404 and the unsorted portion 406. In one example, the controller 108 may determine that the updated data mapping in the unsorted portion 406 is the most recent update and return the data associated with the updated data mapping in the unsorted portion 406. In another example, the controller 108 may return the data associated with the updated data in the sorted portion 404 without searching or returning data in the unsorted portion 406. In yet another example, the controller 108 may return the most updated data corresponding to the most recent update in the sorted portion 404 and the data corresponding to a most recent update in the unsorted portion 406. In other examples, the controller 108 may first search the unsorted portion 406 for the relevant data mapping. When the relevant data mapping is not found in the unsorted portion 406, the controller 108 then searches the sorted portion 404. When the relevant data mapping is not found in the sorted portion 404, then the controller 108 then loads the relevant data mapping from the cache and/or the flash memory, which may be the volatile memory 112 and/or the NVM 110.

It is to be understood that the previously mentioned examples are not intended to be limiting, but to provide an example of a possible embodiment. It is to be further understood that the searched for data mapping corresponds to the data of the read command and reference to a "most recent update" refers to the most recent data mapping corresponding to the data of the read command.

By sorting the data mappings in the uLayer, the translation process (i.e., searching for current data mappings) for read commands may be improved, thus, the throughput and performance of the data storage device may be increased.

In one embodiment, a data storage device includes a memory device and a controller coupled to the memory device. The controller is configured to store data mappings in an uLayer, where the uLayer includes a plurality of mSet updates, and where the uLayer is organized into a sorted section and an unsorted section, sort one or more of the plurality of mSet updates of the uLayer, and provide, to a host device, data stored in the memory device corresponding to a most recent update of a data mapping by ignoring non-recent updates for a read command associated with an mSet group of the sorted section.

The controller is further configured to determine that a first update of the mSet group is not the most recent update of the data mapping, find a next update of the mSet group, and determine if the next update is the most recent update of the data mapping. The sorting is by chronological order and by region. The controller is further configured to execute the sorting during idle time and/or when background operations are being executed. The controller is further configured to receive a first update for a first mSet, store the first update for the first mSet in the unsorted section, receive a second update for a second mSet, store the second update for the second mSet in the unsorted section, wherein the second update is stored adjacent to the first update, receive a third update for the first mSet, and store the third update for the first mSet in the unsorted section, wherein the third update is adjacent to the second update. The controller is further configured to determine that the first mSet is associated with a first mSet group of the sorted section and determine that the second mSet is associated with a second mSet group of the sorted section. The controller is further configured to copy the first update and the third update from the unsorted section to the first mSet group while maintaining chronological order for the first mSet group and copy the second update from the unsorted section to the second mSet group while maintaining chronological order for the second mSet group. The controller is further configured to erase the first update, the second update, and the third update from the unsorted section upon completion of the copying. The mSet group includes one or more mSets.

In another embodiment, a data storage device includes a memory device and a controller coupled to the memory device. The controller is configured to receive a read command for data stored in the memory device, search an uLayer corresponding to the read command for a data mapping, where the uLayer includes a plurality of mSet updates, and where the uLayer is organized into a sorted section and an unsorted section, and retrieve first data stored in the memory device corresponding to a most recent update of the data mapping corresponding to the read command by ignoring non-recent updates for a read command associated with an mSet group of the sorted section.

The controller is further configured to determine that there is another most recent update of the data mapping corresponding to the read command in the unsorted section and retrieve second data stored in the memory device corresponding to the another most recent update of the data mapping for the read command located in another mSet of the unsorted section. The controller is further configured to determine whether the first data or the second data is the most recent update and provide, to a host device, either the first data or the second data based on the determining. The plurality of mSets of the sorted section is sorted by mSet group and by chronological order. The plurality of mSets of the unsorted section is stored in chronological order by arrival time. The controller is further configured to sort the unsorted section into the sorted section, while maintaining chronological order per mSet group of the sorted section, during idle time or background operations occurring. The controller is further configured to determine that a first update corresponds to a first data mapping and a second update corresponds to a the first data mapping, determine whether the first update or the second update is a most recent update, and ignore either the first update or the second update based on the determining. The controller is further configured to keep track of the ignored update in an outdated list. The outdated list is used for block reuse operations.

In another embodiment, a data storage device includes memory means and a controller coupled to the memory means. The controller is configured to store data mappings in an uLayer, where the uLayer includes a plurality of mSet updates, and where the uLayer is organized into a sorted section and an unsorted section.

The controller is further configured to search the sorted section for a most recent update of a data mapping corresponding to data stored in the memory means. The searching is completed in binary search and skips non-relevant updates. The controller is further configured to search the unsorted section for a most recent update of the data mapping prior to searching the sorted section and either provide the data mapping when the most recent update is present in the unsorted section or search the sorted section for the most recent update of the data mapping. When the most recent update is not in the sorted section or the unsorted section, the controller is further configured to load the data mapping from the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, the controller configured to:
store data mappings in an uLayer, wherein the uLayer includes a plurality of mSet updates, and wherein the uLayer is organized into a sorted section and an unsorted section;
sort one or more of the plurality of mSet updates of the uLayer, wherein the uLayer is a linked list of data mapping updates, and wherein an mSet includes a plurality of logical block address (LBA) to physical block address (PBA) mappings; and
provide, to a ho st device, data stored in the memory device corresponding to a most recent update of a data mapping by ignoring non-recent updates for a read command associated with an mSet group of the sorted section, wherein the controller is further configured to:
receive a first update for a first mSet;
store the first update for the first mSet in the unsorted section;
receive a second update for a second mSet;
store the second update for the second mSet in the unsorted section, wherein the second update is stored adjacent to the first update;
receive a third update for the first mSet; and
store the third update for the first mSet in the unsorted section, wherein the third update is adjacent to the second update, wherein the controller is further configured to:
determine that the first mSet is associated with a first mSet group of the sorted section; and
determine that the second mSet is associated with a second mSet group of the sorted section, wherein the controller is further configured to:
copy the first update and the third update from the unsorted section to the first mSet group while maintaining chronological order for the first mSet group; and
copy the second update from the unsorted section to the second mSet group while maintaining chronological order for the second mSet group.

2. The data storage device of claim 1, wherein the controller is further configured to erase the first update, the second update, and the third update from the unsorted section upon completion of the copying.

3. A data storage device, comprising:
a memory device; and
a controller coupled to the memory device, the controller configured to:
receive a read command for data stored in the memory device;
search an uLayer corresponding to the read command for a data mapping, wherein the uLayer includes a plurality of mSet updates, and wherein the uLayer is organized into a sorted section and an unsorted section, wherein the uLayer is a linked list of data mapping updates, and wherein an mSet includes a plurality of logical block address (LBA) to physical block address (PBA) mappings; and
retrieve first data stored in the memory device corresponding to a most recent update of the data mapping corresponding to the read command by ignoring non-recent updates for a read command associated with an mSet group of the sorted section, wherein the controller is further configured to:
determine that there is another most recent update of the data mapping corresponding to the read command in the unsorted section; and
retrieve second data stored in the memory device corresponding to the another most recent update of the data mapping for the read command located in another mSet of the unsorted section.

4. The data storage device of claim 3, wherein the controller is further configured to:
determine whether the first data or the second data is the most recent update; and
provide, to a host device, either the first data or the second data based on the determining.

5. The data storage device of claim 3, wherein the plurality of mSets of the sorted section is sorted by mSet group and by chronological order, and wherein the plurality of mSets of the unsorted section is stored in chronological order by arrival time.

6. A data storage device, comprising:
   a memory device; and
   a controller coupled to the memory device, the controller configured to:
   receive a read command for data stored in the memory device;
   search an uLayer corresponding to the read command for a data mapping, wherein the uLayer includes a plurality of mSet updates, and wherein the uLayer is organized into a sorted section and an unsorted section, wherein the uLayer is a linked list of data mapping updates, and wherein an mSet includes a plurality of logical block address (LBA) to physical block address (PBA) mappings; and
   retrieve first data stored in the memory device corresponding to a most recent update of the data mapping corresponding to the read command by ignoring non-recent updates for a read command associated with an mSet group of the sorted section, wherein the controller is further configured to sort the unsorted section into the sorted section, while maintaining chronological order per mSet group of the sorted section, during idle time or background operations occurring.

7. The data storage device of claim 6, wherein the controller is further configured to:
   determine that a first update corresponds to a first data mapping and a second update corresponds to a the first data mapping;
   determine whether the first update or the second update is a most recent update; and
   ignore either the first update or the second update based on the determining.

8. The data storage device of claim 7, wherein the controller is further configured to keep track of the ignored update in an outdated list, and wherein the outdated list is used for block reuse operations.

9. A data storage device, comprising:
   memory means; and
   a controller coupled to the memory means, the controller configured to:
   store data mappings in an uLayer, wherein the uLayer includes a plurality of mSet updates, and wherein the uLayer is organized into a sorted section and an unsorted section, wherein the uLayer is a linked list of data mapping updates, and wherein an mSet includes a plurality of logical block address (LBA) to physical block address (PBA) mappings, wherein the controller is further configured to search the sorted section for a most recent update of a data mapping corresponding to data stored in the memory means, wherein the controller is further configured to:
   search the unsorted section for a most recent update of the data mapping prior to searching the sorted section; and
   either:
      provide the data mapping when the most recent update is present in the unsorted section; or
      search the sorted section for the most recent update of the data mapping, wherein, when the most recent update is not in the sorted section or the unsorted section, the controller is further configured to load the data mapping from the memory means.

10. The data storage device of claim 9, wherein the searching is completed in binary search and skips non-relevant updates.

* * * * *